United States Patent [19]

Yarrington

[11] Patent Number: 4,906,815
[45] Date of Patent: Mar. 6, 1990

[54] LOW-VOLTAGE ELECTRIC BRANDING IRON

[76] Inventor: Arthur G. Yarrington, Ms 1073, Crow's Nest, 4355 Queensland, Australia

[21] Appl. No.: 323,058

[22] Filed: Mar. 14, 1989

Related U.S. Application Data

[63] Continuation of Ser. No. 86,078, filed as PCT AU86/00280 on Sep. 29, 1986, published as WO87/02318 on Apr. 23, 1987, abandoned.

[30] Foreign Application Priority Data

Oct. 8, 1985 [AU] Australia ............................ 2784

[51] Int. Cl.⁴ .................. A01K 11/00; A22C 17/10; H05B 3/00; H05B 3/46
[52] U.S. Cl. ................................. 219/233; 101/31; 219/227; 219/240
[58] Field of Search ........................ 101/31, 25, 29; 219/227, 240, 233, 235, 228, 229, 221

[56] References Cited

U.S. PATENT DOCUMENTS

| | | | |
|---|---|---|---|
| 1,850,280 | 3/1932 | Haynes | 219/227 |
| 1,905,364 | 4/1933 | Brindley | 219/227 |
| 2,033,897 | 3/1936 | Jenkins et al. | |
| 2,514,618 | 7/1950 | Ancell | 219/227 |
| 2,707,224 | 4/1955 | Hall | 219/227 |
| 2,712,587 | 7/1955 | Story | |
| 2,772,339 | 11/1956 | Bennett et al. | 219/227 |
| 2,777,933 | 1/1957 | Weaver et al. | 219/227 |
| 3,067,314 | 12/1962 | Helbing | 219/227 |

FOREIGN PATENT DOCUMENTS

| | | | |
|---|---|---|---|
| 1705728 | of 1929 | Australia. | |
| 100480 | 3/1937 | Australia | 101/31 |
| 115969 | 9/1942 | Australia. | |
| 8910582 | 4/1984 | Australia. | |
| 0075361 | 3/1983 | European Pat. Off.. | |
| 56652 | 1/1969 | Poland | 219/227 |
| 268789 | 8/1970 | U.S.S.R. | 219/233 |
| 844418 | 8/1960 | United Kingdom | 219/228 |
| 911736 | 11/1962 | United Kingdom | 219/227 |

*Primary Examiner*—A. Bartis
*Attorney, Agent, or Firm*—Armstrong, Nikaido, Marmelstein, Kubovcik & Murray

[57] ABSTRACT

A portable branding device which uses a high current/low voltage power source such as a twelve volt tractor battery, for heat branding of livestock. The device includes a hollow body having first and second ends and a handle portion. A plurality of brand elements are detachable mounted to the second end and spaced from the second end. The branding device has an insulating panel. A plurality of legs is connected to the insulating panel for supporting the brand element. A series of terminals extend through the insulating panel and the brand element is attached to the terminals. Electrical connecting devices connect the brand element in spaced relation to the second end of the main body and a high current relay switching means, such as a solenoid switch is mounted within the main body for transmitting electricity to the brand element. A low current finger actuated switch is connected to the handle for actuating the high current relay switching means.

17 Claims, 2 Drawing Sheets

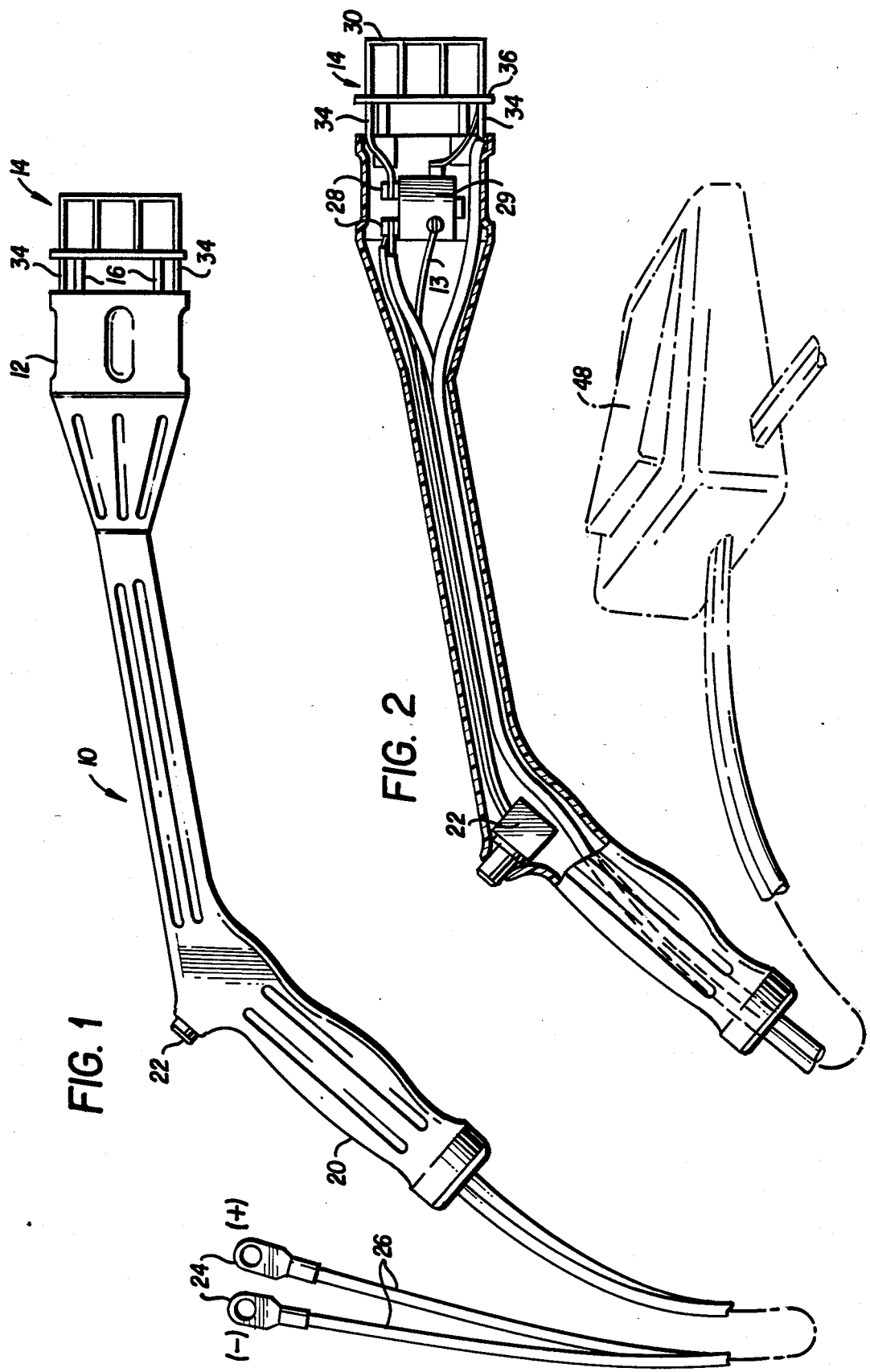

though such adverse weather conditions are best suited for freeze branding or fire branding operations.

LOW-VOLTAGE ELECTRIC BRANDING IRON

CROSS-REFERENCE TO RELATED APPLICATION:

This application is a continuation of U.S. Ser. No. 086,078 filed as PCT AU86/00280 on Sep. 29, 1986, published as WO87/02318 on Apr. 23, 1987, now abandoned.

FIELD OF THE INVENTION

This invention relates to device for heat brand marking of live-stock.

BACKGROUND OF THE INVENTION

The invention has been devised to provide a novel device for marking live-stock by heat-branding without the inconvenience of starting and maintaining fires or fuel heaters. The invention can be used in the field in a more efficient manner than known forms of branding equipment. The device of the invention combines both the heating medium and the branding element in a single hand held apparatus. Due to the accurate temperature range which can be maintained at the branding head assembly of the invention, over-burning, mis-branding, and damage to the animal hide can be avoided. The device provides a cleaner more distinct brand, and eliminates blotching and burn damage to the hide. A brand can be applied to the hide in a very short time period due to the heat concentrated at the branding face, and therefore, greatly reduces stress to the animal being branded. Using the invention to brand an animal is over 100 times quicker than freeze branding and greatly reduces the handling stress on the animal by minimizing captivity and handling time. The invention has been expressly devised for the purpose of being operated from a vehicle, tractor or small generator-battery plant, by simple connection to the battery terminals of a mobile unit. The alternator charging circuit of the modern vehicle or tractor more than compensates for power drawn from its battery by the invention, and easily maintains full charge during marking operations. Alternatively, the vehicle can be periodically started and run for a short period to maintain battery charge. The branding iron may also be operated from a battery remotely located from the charging source. In such a case the battery requires periodic charging. Alternatively, the branding iron can have its own portable motor driven charger to maintain battery charge while in constant use.

The device, of the invention, can be produced in an economical manner and may be readily used in the branding of animals.

In accordance with one embodiment, the apparatus comprises a hand held main body assembly including a handle having a finger actuated control switch or lever operated switch to control operation of a high current relay switching means of either a solenoid switch or a thyristor junction switch mounted within the body of the apparatus. The body extends from the handle to form a pod extending a short length from the handle. The pod houses the electrical wiring and high current relay switching means to control the high current feed to the branding head assembly mounted on an end of the pod away from the handle. The brand element consists of a solid or cored construction manufactured from heavy gauge wire, rod, tube or form section from an alloy with high temperature working capabilities and low oxidizing characteristics when heated. Such an element is shaped into a facsimile of a desired brand design. The cross-sectional area of the conducting wire, rod, tube or form section is of such a construction as to reach high temperatures in a matter of seconds due to low circuit resistance which allows a high current to pass through the element when connected across a low voltage/high current source, such as a vehicle traction battery, or other suitable low voltage/high current power source. The conductive metal brand element can be composed of one or more wires, rods, tubes or form sections to make up the element design, and can be interchanged with various brand designs as desired. The hand held extension of the main body assembly incorporates a finger actuated control switch, which when operated, energizes the main solenoid relay or switch closing the contacts in the low voltage/high current circuit between the power source and the conductive metal brand element. The operator, by use of the finger actuated control switch, controls the brand element temperature and the period of time that such a temperature should be maintained. An automatic timing device, or a heat sensitive relay, can be incorporated into the element, solenoid, or high current relay switching means to control the length of time current passes through the metal branch element. The high current relay switching means can be a magnetic solenoid or a thyristor junction switch mechanism. The conductive metal brand element assembly is mounted on an insulated heat resisting panel attached to the extremity of the hand held extension. Positive and negative cables from the power source pass along or inside the main body through the make and break contacts of the high current relay switching means to the terminals of the heating element body. A small tap wire feeds through the operator's finger actuated control switch and back to the high current relay switching means to a common lead to provide the switching circuit to energize the high current relay switching means. The high current relay switching means operates similar to a vehicle starter solenoid switch.

The brand element itself is mounted on an insulating panel and is supported a short distance from the panel by a series of legs or struts. These legs or struts are welded or otherwise attached to, or are part of, the conductive metal brand element. The legs or struts provide rigid support for the conductive metal brand element when heated, and provide an air gap between the brand element and the insulating panel. Supporting the brand element in this manner allows free penetration of the brand element through the fur of the animal being branded to allow contact of the animal hide with the heated brand element to kill hair follicles and form a brand mark on the animal.

There is no electric current from the power source passing through the legs or struts supporting the brand element and these supports remain reasonably cool and draw very little heat from the brand element. The electrical circuit is so arranged that the heating current only passes through the brand element by means of two or more connecting conductive studs passing through the heat resistant insulating panel to connect to the power source by means of the circuit through the high current relay switching means.

By using this invention, branding can be effectively operated under all climatic conditions such as rain, cold, or windy weather conditions. Of course, such adverse weather conditions make it impossible to conduct fire branding.

SUMMARY OF THE INVENTION

The device of the invention is a portable branding device which uses a high current/low voltage power source such as a twelve volt tractor battery, for heat branding of livestock. The device includes a hollow body having first and second ends and a handle portion. A brand element is detachably mounted to the second end and is spaced from the second end. The branding device has an insulating panel. A plurality of legs is connected to the insulating panel for supporting the brand element. A series of terminals extend through the insulating panel and the brand element is attached to the terminals. Electrical connecting devices connect the brand element in spaced relation to the second end of the main body and a high current relay switching means, such as a solenoid switch is mounted within the main body for transmitting electricity to the brand element. A low current finger actuated control switch is connected to the handle for actuating the high current relay switching means or solenoid switch.

BRIEF DESCRIPTION OF THE DRAWINGS

FIG. 1 is a side view in elevation showing the complete hand held apparatus.

FIG. 2, is a sectional view of the apparatus showing wiring and components, and a foot pedal, in phantom lines, for operating the apparatus.

DETAILED DESCRIPTION OF THE INVENTION

Figure 3:
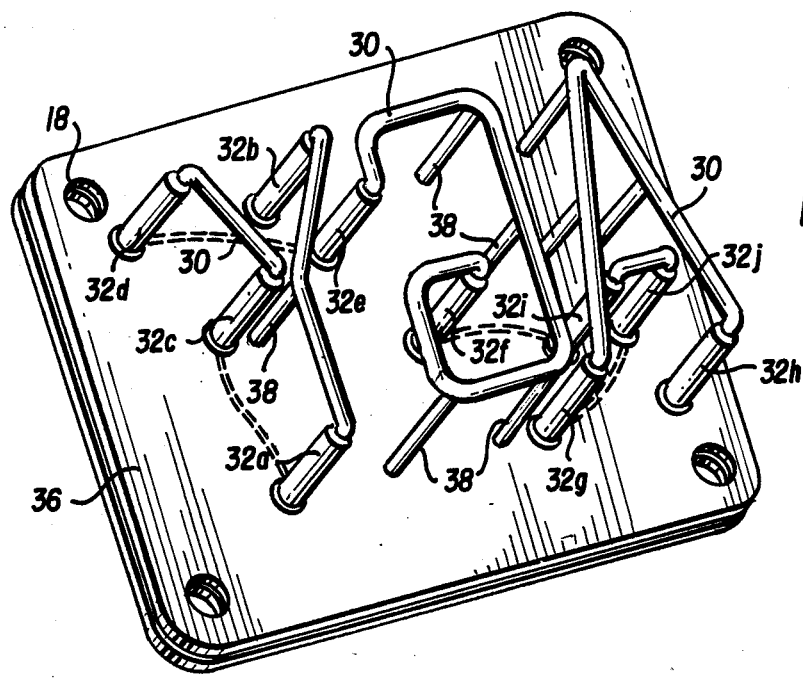
FIG. 3, is a perspective view of the branding head assembly (unattached to the main body).

FIG. 1, shows a typical embodiment of the device of the invention. In broad terms the device consists of a main body 10 composed of an aluminum casting or plastic molding arranged in two recessed halves which bolt or rivet together. Vent holes 12 are provided for cooling. The attached branding head assembly 14, more clearly shown in FIG. 3, is attached or bolted to main body 10 by bolts or studs 16 passing through holes 18 shown in FIG. 3. The operator's gripping handle 20, of main body 10, houses finger actuated control switch 22 mounted adjacent to gripping handle 20. Battery terminal lugs 24 and wire leads 26 pass down through the core of the main body 10 to locate the positive lead on terminals 28 of enclosed high current relay switching means 29, which is more clearly shown in FIG. 2. The negative lead connects to a terminal of metal brand elements 30 formed by one of the connecting studs 32 a-j by terminal lead 34. An additional terminal lead 34 of brand elements 30 connects to the dead side of the normally open high current relay switching means 29 shown in FIG. 2. The heat resistant insulating panel 36 of the branding head assembly 14 supports the brand elements 30 on support legs 38 and connecting studs 32 a-j. Referring to FIG. 3, the support legs 38 of the brand element pass through only the front layer of heat resistant insulating panel 36 and are locked in place by locking means 38a connected to the legs and received in the space between the layers of panel 36, and connecting studs 32 pass through both layers of insulation to allow for electrical cross connecting and connection to brand elements from terminal 34 on connecting studs 32. Electrical connector studs 32 are approximately four times the cross sectional area of the metal brand elements 30 to allow full current carrying capacity without heating. The support legs 38 attach to the metal brand elements by being crimped in the slotted back of the brand elements 30 or by being stud-welded onto this member or attached in any suitable manner of welding or crimping.

The components of the device are now described in greater detail:

The wire leads 26 and the battery terminal lugs 24 have sufficiently short term current carrying capacity to supply power to the brand elements 30 with negligible voltage drop in wire leads 26. Wire leads 26 are of sufficient length to allow an operator to maneuver around an animal to be branded.

The heat resistant insulating panel 36 is composed of a high impact strength heat resistant insulation material such as a zircon fiberglass reinforced resin composition.

The brand element 30 is formed of a nickel-chrome heat resistant alloy having low oxidizing characteristics such as INCOLOY or INCONEL which are registered trademarks.

The support legs 38 are composed of an alloy similar to the composition of brand elements 30.

The finger actuated control switch 22 is a suitable single line toggle or press contact low current switch.

The high current relay switching means 29 is a normal automotive type starter solenoid switch of approximately 150 A. short term rating.

The branding assembly shown in FIG. 3 can be a bolt or exchangeable assembly or an exchangeable plug-in assembly. The branding head assembly is made up as a complete component exhibiting the desired brand symbols or designs. In the arrangement shown in FIG. 3 the positive and the negative terminals are respectively, connective studs 32b and 32h.

Interconnections on the back of the panel include 32a to 32c, 32d to 32e, 32f to 32i, and 32j to 32g. This circuitry arrangement as shown is a series circuitry which maintains even distribution of heat over the element.

Figure 4:
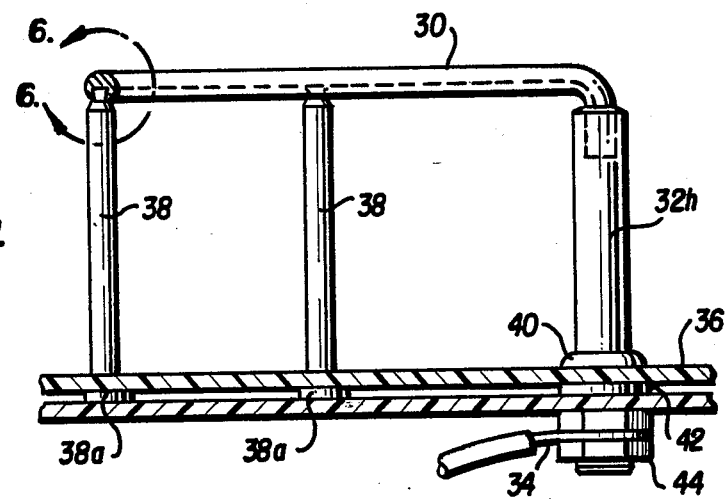
FIG. 4, is an enlarged fragmentary view in elevation and partly in section of the arrangement of the element and the legs or struts supporting the element on the heat resistant insulating panel.
Figure 6:
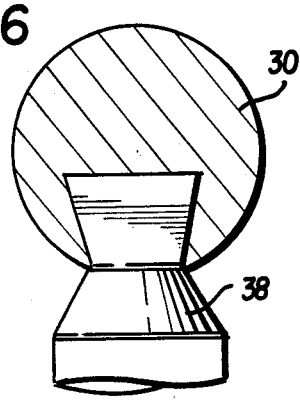
FIG. 6, is an enlarged view taken at line 6—6 in FIG. 4 and showing the connection between the element and the legs in FIG. 4.
Figure 5:
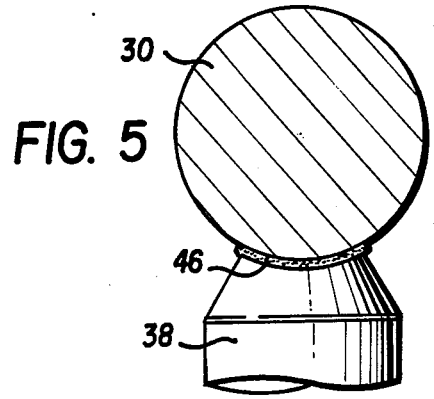
FIG. 5, is an enlarged fragmentary view in elevation and partly in section of an alternate arrangement for supporting the brand element with the legs or struts attached to the heat resisting insulated panel.

Illustrated in a fragmentary view, part in section, as shown in FIGS. 4 and 6, is a slotted brand element or rod 30 crimped over the formed edges of legs or struts 38 located in the heat insulating panel 36. Also shown is the arrangement of the connecting stud 32h where brand element 30 is fitted into and welded to the connecting stud 32h having a fixed collar 40, spacer 42 and terminal lead 34 held in place by lock nut 44. An alternate assembly is shown in FIG. 5 where brand element wire or rod 30 is fastened to legs or struts 38 by weld 46.

To those skilled in the art to which the invention relates, many changes in construction and design and widely differing embodiments and application of the invention will suggest themselves, without departing from the spirit and scope of the invention. For example, the branding device 10 of the invention may include a foot pedal switch 48 shown in phantom in FIG. 2 so that the device can be actuated by the foot of an operator leaving the operators hands free for maneuvering the device to brand an animal. Accordingly, the disclosures and description herein are purely illustrative and are not intended to limit or restrict the invention to a precise form.

I claim:

1. An improved portable instant heat electric branding device operable from a high current low voltage power source, said device comprising:
   a hollow main body having first and second ends;
   a handle portion at said first end;
   a brand element assembly detachably mounted to said second end and being spaced from said second end, said brand element assembly comprising first and second insulating panels arranged in spaced-apart relation with respect to each other and defining a space therebetween, said first insulating panel being located nearer said second end than said second insulating panel, at least one brand element, a plurality of support legs fixedly secured to said second insulating panel for supporting each of said at least one brand element in spaced relation with respect to said second insulating panel, and a series of terminals extending through said first and second insulating panels, each of said at least one brand element being fixedly attached to selected ones of said terminals, said terminals locking said first and second insulating panels in said spaced-apart relation with respect to each other;
   means for connecting said brand element assembly in spaced relation with respect to said second end of said hollow main body;
   high current relay switching means mounted within said second end of said hollow main body connected to said terminals for transmitting electricity to said at least one brand element;
   low current switching means for actuating said high current relay switching means.

2. A device as claimed in claim 1, wherein said high current low voltage power source is a 12 volt tractor battery.

3. A device as claimed in claim 1, wherein said first and second insulating panels are fabricated from a heat and impact resistant material.

4. A device as claimed in claim 3, wherein said heat and impact resistant material is a fiberglass reinforced resin material.

5. A device as claimed in claim 1, wherein each of said at least one brand element is fixedly attached to said terminals by welding.

6. A device as claimed in claim 1, wherein said high current relay switching means is mounted integrally with said main body, said device being connected to a power source only by electric current supply leads extending therebetween.

7. A device as claimed in claim 6, wherein said high current relay switching means is an automotive type solenoid starter switch specifically designed for a switching operation as applied to a high current, low voltage circuit, said starter switch having two high current terminals, one being connected to an incoming positive lead of an electric current feed line and the other being connected to an input terminal of said least one brand element, a negative lead of said electric current feed line being directly connected to another input terminal of said at least one brand element.

8. A device as claimed in claim 1, wherein said at least one brand element is formed from a nickel-chrome heat resisting alloy with low oxidizing characteristics.

9. A device as claimed in claim 1, wherein there is provided a series of brand elements spaced from said second insulating panel and lying in a common plane, said brand elements being held at intermediate positions by said plurality of support legs, one end of each said leg being fixedly attached to said brand elements, the other end of each said leg being attached and locked to said second insulating panel.

10. A device as claimed in claim 1, wherein each of said support legs is formed with a connecting member at a remote end thereof and said at least one brand element is formed of a rod having a recessed groove formed continuously on one side thereof, said connecting element member being receivable in said continuous groove to connect said leg and said rod together and maintain said rod in spaced relation from said second insulating panel, the other end of said leg being formed with locking means for locking said legs to said insulating panel.

11. A device as claimed in claim 1, wherein said at least one brand element is welded to said support legs to maintain said at least one brand element in spaced relation from said second insulating panel, said legs having locking means for locking to said second insulating panel.

12. A device according to claim 11, wherein said locking means are received in said space between said first and second insulating panels.

13. A device as claimed in claim 1, wherein said low current switching means is a finger operated switch located on said handle portion.

14. A device as claimed in claim 1, wherein said low current switching means is a foot operated switch connected to a power source.

15. A device according to claim 1, wherein said at least one brand element is able to be intermittently heated in the range of 600 to 1000 degrees C.

16. A device according to claim 1, wherein said brand element assembly rigidly supports said at least one brand element while allowing for expansion and contraction during a heat cycle.

17. An improved portable instant heat electric branding device operable from a high current low voltage power source, said device comprising:
   a hollow main body having first and second ends;
   a handle portion at said first end;
   a brand element assembly detachably mounted to said second end, said brand element assembly comprising first and second insulating panels arranged in spaced-apart relation with respect to each other and defining a space therebetween, said first insulating panel being located nearer said second end than said second insulating panel, at least one brand element, a plurality of support legs connected to said second insulating panel for supporting each of said at least one brand element in spaced relation with respect to said second insulating panel, and a series of terminals extending through said first and second insulating panels, each of said at least one brand element being fixedly attached to selected ones of said terminals, said terminals locking said first and second insulating panels in said spaced-apart relation with respect to each other;
   locking means connected to said support legs for locking said support legs to said brand element assembly, said locking means being received in said space between said first and second insulating layers;
   high current relay switching means mounted within said second end of said hollow main body connected to said terminals for transmitting electricity to said at least one brand element;
   low current manually operated switching means connected to said handle portion for actuating said high current relay switching means.

* * * * *